(12) United States Patent
Bendinelli et al.

(10) Patent No.: US 6,792,618 B1
(45) Date of Patent: Sep. 14, 2004

(54) VIEWER CUSTOMIZATION OF DISPLAYED PROGRAMMING BASED ON TRANSMITTED URLS

(75) Inventors: Samuel J. Bendinelli, Montgomery, NJ (US); Eugene J. Rosenthal, Edison, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/033,279

(22) Filed: Mar. 2, 1998

(51) Int. Cl.[7] .............................................. H04N 7/173
(52) U.S. Cl. ...................................... 725/112; 725/110
(58) Field of Search ............................ 725/45, 46, 47, 725/44, 48, 49, 51, 109, 112, 113, 110, 32, 34, 86, 87, 100, 131, 133, 37, 88, 61; 348/460, 461, 465, 473, 474, 569, 563, 564; H04N 5/445, 7/173

(56) References Cited

U.S. PATENT DOCUMENTS

| | | | |
|---|---|---|---|
| 4,264,924 A | | 4/1981 | Freeman |
| 4,569,026 A | * | 2/1986 | Best .......................... 345/716 |
| 4,602,279 A | | 7/1986 | Freeman |
| 4,885,775 A | | 12/1989 | Lucas |
| 4,894,789 A | | 1/1990 | Yee |
| 4,924,303 A | | 5/1990 | Brandon et al. |
| 4,954,882 A | | 9/1990 | Kamemoto |
| 5,008,750 A | | 4/1991 | Gomikawa |
| 5,148,272 A | | 9/1992 | Acampora et al. |
| 5,369,669 A | | 11/1994 | Tombal et al. |
| 5,446,919 A | | 8/1995 | Wilkins |
| 5,493,339 A | | 2/1996 | Birch et al. |
| 5,508,733 A | | 4/1996 | Kassatly |
| 5,541,638 A | | 7/1996 | Story |
| 5,550,863 A | | 8/1996 | Yurt et al. |
| 5,555,025 A | | 9/1996 | McArthur |
| 5,568,181 A | | 10/1996 | Greenwood et al. |
| 5,585,858 A | | 12/1996 | Harper et al. |
| 5,602,582 A | * | 2/1997 | Wanderscheid et al. ..... 725/139 |

(List continued on next page.)

FOREIGN PATENT DOCUMENTS

DE        3717261 A1    of 0000

OTHER PUBLICATIONS

S. Leemon, "Switching Channels: The new generation of PCI TV tuner cards makes it easier than ever to watch TV on your PC," http://www.zdnet.com/cshopper/content/9710/cshp0143.html, Oct. 1997.

S. Leemon, "Switching Channels: Between the Lines," http://www.zdnet.com/cshopper/content/9710/cshp0144.html, Oct. 1997.

Primary Examiner—Vivek Srivastava

(57) ABSTRACT

Uniform Resource Locators (URLs) or other network information identifiers embedded in television signals are processed in order to permit viewers to customize the display of a corresponding program. In an illustrative embodiment, at a time prior to the scheduled display of a program or portion thereof, a given viewer makes a selection of one of a number of available alternate characteristics for the program, such as one of a number of available alternate endings. At a later time, a base URL embedded in the television signal is extracted and processed using the viewer selection in order to generate a combined URL. The combined URL is then used to establish a connection over a network with a corresponding web site or other information source, and information is retrieved from the web site and stored in a memory. The retrieved information is subsequently taken from the memory and used to modify the manner in which the program is displayed to the viewer. For example, the retrieved information may include video which is displayed to the viewer in place of a portion of the program.

36 Claims, 5 Drawing Sheets

U.S. PATENT DOCUMENTS

| | | |
|---|---|---|
| 5,619,247 A | 4/1997 | Russo |
| 5,657,072 A | 8/1997 | Aristides et al. |
| 5,699,124 A | 12/1997 | Nuber et al. |
| 5,701,582 A | 12/1997 | DeBey |
| 5,721,815 A | 2/1998 | Ottesen et al. |
| 5,721,829 A | 2/1998 | Dunn et al. |
| 5,724,091 A | 3/1998 | Freeman et al. |
| 5,724,103 A | 3/1998 | Batchelor |
| 5,734,413 A | 3/1998 | Lappington et al. |
| 5,734,432 A | 3/1998 | Netravali et al. |
| 5,737,552 A * | 4/1998 | Lavallee et al. ............ 345/720 |
| 5,778,181 A | 7/1998 | Hidary et al. |
| 5,781,730 A * | 7/1998 | Reimer et al. .............. 709/203 |
| 6,061,719 A | 5/2000 | Bendinelli et al. |
| 6,181,334 B1 * | 1/2001 | Freeman et al. ............ 725/138 |
| 6,260,194 B1 * | 7/2001 | Shiels et al. ................ 725/134 |
| 6,473,903 B2 * | 10/2002 | Balakrishnan et al. ...... 725/135 |

* cited by examiner

VIEWER CUSTOMIZATION OF DISPLAYED PROGRAMMING BASED ON TRANSMITTED URLS

FIELD OF THE INVENTION

The present invention relates generally to techniques for integrating television and computer systems.

BACKGROUND OF THE INVENTION

It is not uncommon for television programming transmitted to viewers to include Internet web addresses or other information that the viewers can use to access additional information related to the programming. For example, television advertisements often include Uniform Resource Locators (URLs) which identify the web site of the advertising company. Similarly, television news programs and televised events often display URLs which identify web sites corresponding to the respective programs and events. In this type of arrangement, a viewer desiring to access a URL displayed in a television program must either write down the URL or attempt to remember it. The viewer then enters the URL in a browser program on their personal computer in order to access the corresponding web site.

Recently, systems have been developed which allow viewers to access web sites from a television using a television set-top box. Such systems typically operate in a manner similar to web browsers on personal computers. As a result, such systems are generally unable to extract a URL from a televised program such that the viewer need not reenter it to access the corresponding web site. Furthermore, such systems are unable to present web content to a viewer in synchronization with television programming which includes the corresponding URLs. For example, even a viewer which has a computer and a television in close proximity must continually enter the televised URLs in order to view a sequence of web content related to the television programming. Other systems integrate a television tuner and a computer, enabling the display of web pages on the same monitor and at the same time as a television program. However, the web page section and the television program section in such systems operate independently.

U.S. patent application Ser. No. 08/965,633, filed Nov. 6, 1997 in the name of inventors Samuel J. Bendinelli and Venkatesh Krishnaswamy, subsequently issued on May 9, 2000 as U.S. Pat. No. 6,061,719, and assigned to the assignee of the present application, discloses techniques for transmitting URLs with a television signal so as to synchronize the presentation of information from corresponding web pages with the displayed programming of the television signal. However, as proposed in application Ser. No. 08/965, 633, all viewers of the same television program are directed to the same URL at the same time, at least insofar as the automatic synchronization feature described in that application operates.

SUMMARY OF THE INVENTION

We have recognized that since the features of application Ser. No. 08/965,633 comport with the conventional notion of broadcast television that all viewers should see the same thing, these features are limited in some respects. For example, the automatic synchronization feature generally does not permit viewers to utilize transmitted URLs to customize the manner in which a program is displayed so as to better suit their personal preferences.

Therefore, in accordance with the principles of the invention, URLs, or other network information identifiers, transmitted with television signals permit viewers to alter the presentation of the corresponding programs. In accordance with one aspect of the invention, a base URL or other network information identifier embedded in a television signal is used as a first input to a function, which also receives as an input viewer selection information, e.g., stored in memory at the receiving location. The viewer selection is made at a time prior to the scheduled display of a program or portion thereof, from among a number of available alternate characteristics for the program, such as one of a number of available alternate endings. The function determines a combined URL which identifies information which is ultimately retrieved and displayed to a viewer. For example, the retrieved information may be video which is displayed to the viewer in place of at least a portion of the program. As another example, the retrieved information may be a web page or pages, with different portions of the program displayed in different windows of the page or pages. The television signal may also include timing information, which indicates when the retrieved information should be displayed to the viewer, and size and location information, which indicates the respective size and location of one or more windows in which the retrieved information or portions thereof may be displayed to the viewer. Thus, an integration of the viewer-customized retrieved information and the broadcast program information may be achieved. Advantageously, the viewing experience may be customized for each television set or other display device with the ability to display web pages in response to viewer selection information stored at the receiving location.

In accordance with another aspect of the invention, the viewer selection of a program ending or other program characteristic may be made in response to a selection display generated using an additional URL transmitted with the television signal. For example, the selection display may be in the form of a web page retrieved using the additional URL. The selection display may list the available alternate program characteristics along with statistical information regarding previous selections made by other viewers. This allows a viewer to determine which of the alternate program characteristics have been most popular with other viewers. The statistics may also be supplied to content providers for use in determining information such as audience share and viewer preferences.

DETAILED DESCRIPTION OF THE INVENTION

The invention will be described below in conjunction with a number of illustrative embodiments for customizing displayed program content based on transmitted Uniform Resource Locators (URLs). The invention is not limited to use in these embodiments, but is instead more generally applicable to any system in which it is desirable to transmit, in conjunction with a television signal or any other type of transmitted programming, URLs or other identifiers which specify web sites or other sources of information available over a computer network. The term "network information identifier" as used herein should be understood to include URLs as well as any other type of network information identifier. The term "web" as used herein is intended to include not only the World Wide Web portion of the Internet, but also other portions of the Internet as well as other types of computer networks including intranets and extranets. The term "web site" should be understood to include any source of information which can be specified by a URL or other type of network information identifier. The term "television signal" as used herein is intended to include analog video signals in accordance with NTSC, PAL or other standard formats, digital video signals including-MPEG-encoded signals, high definition television (HDTV) signals, and any other type of image signal which may be supplied to a receiver via broadcast airwaves, cable network, satellite network, digital subscriber loop (DSL), computer network or any other type of signal distribution mechanism. The term "processor" as used herein is intended to include any type of processing device which may be utilized in a set-top box, computer, tuner card, television receiver or similar display generating mechanism.

Figure 1:
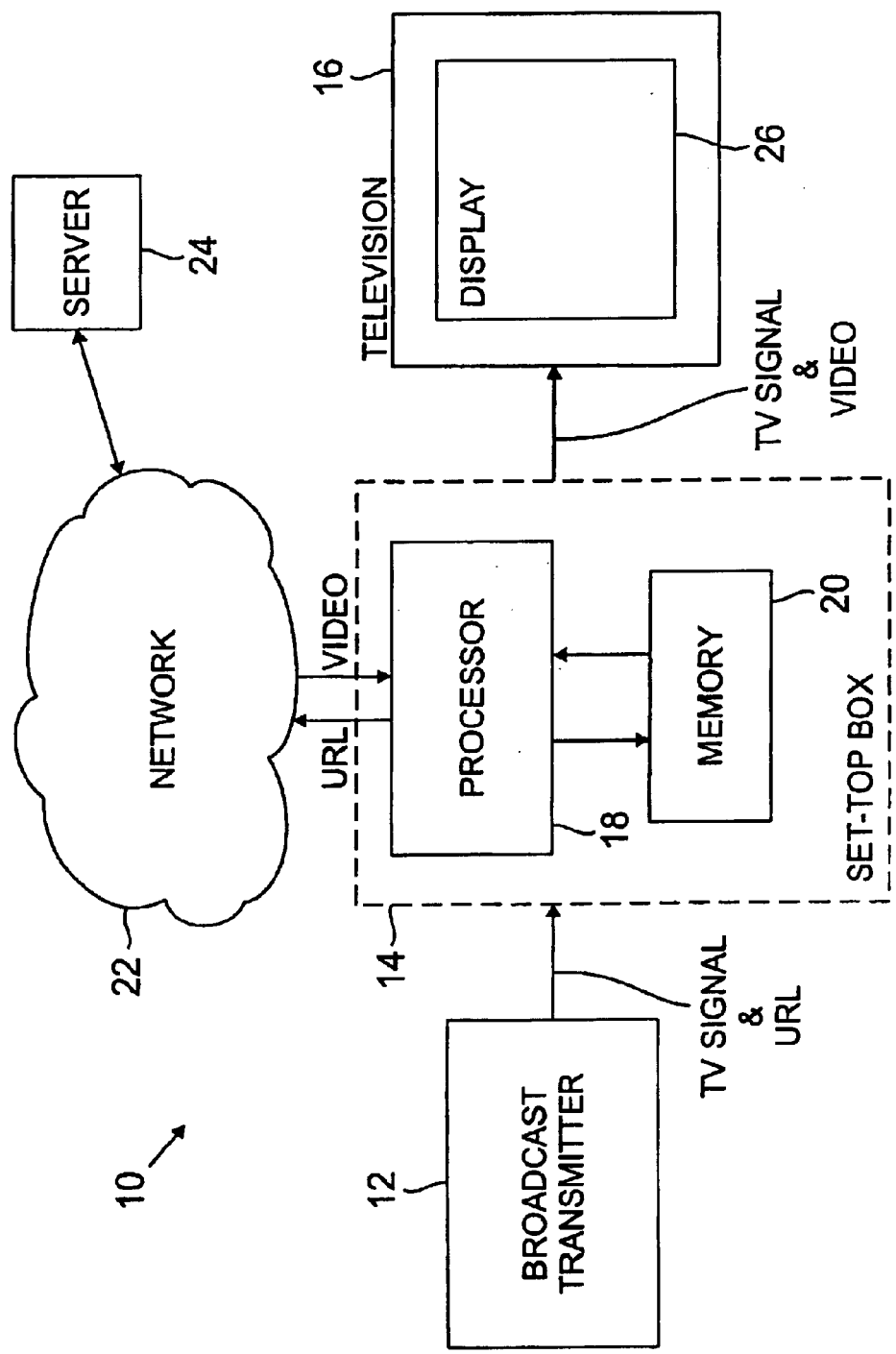
FIG. 1 illustrates an exemplary embodiment of the invention in which a set-top box extracts and processes Uniform Resource Locators (URLs) or other network information identifiers embedded in a transmitted television signal.

FIG. 1 shows a system 10 for implementing viewer-customized display of transmitted programming in accordance with the invention. The system 10 includes a broadcast transmitter 12, a set-top box 14 and a television 16. A television signal transmitted from the broadcast transmitter 12 includes a program portion and one or more URLs. The URLs are transmitted so as to coincide with specified sections of the television programming represented by the program portion of the signal. For example, when the programming nears the ending of a particular program, the corresponding transmitted URL may identify a web site which stores video for several alternate endings to the program. Alternatively, near the beginning of a mystery show, information may be retrieved to obscure, or provide, various clues to the mystery's resolution. Numerous other relationships between the transmitted programming and URLs are of course possible. The television signal may be received in the system 10 in a conventional manner via an antenna, cable network, satellite receiver or other type of conventional signal reception device, and is applied to an input of the set-top box 14 as shown.

The set-top box 14 includes a processor 18 and a memory 20. All or some of the memory 20 may be within set-top box 14. The processor 18 operates in accordance with instructions stored in the memory 20 to provide a number of functions for extracting and processing URLs embedded in a received television signal. As described in the above-cited U.S. patent application Ser. No. 08/965,633, the URLs may be transmitted as strings embedded in the closed caption text stream of the television signal. A given URL string transmitted in this manner may be delimited by a known character, or set of characters, that appears in the closed caption text stream before and after the URL string. For example, brackets or quotes may be used as delimiting characters for a URL string. In this case, the processor 18 may operate as a decoder with appropriate hardware or software logic functions for extracting URLs from the closed caption stream. Alternatively, a separate closed caption decoder may be included in the set-top box 14. It should be noted that the embodiment of FIG. 1 does not require the use of a closed caption decoder. Alternative embodiments may use any other type of decoder or other processor which is capable of extracting a URL from a transmitted television signal.

The set-top box 14 in this embodiment includes an internal telephone line modem, a cable modem, a network interface card (NIC) or other similar device suitable for establishing a network connection with a network 22. The network 22 may be, for example, the Internet or any other computer, cable or satellite network as well as various portions or combinations thereof. The set-top box 14 may also implement a web browser program or other suitable network access software. The set-top box 14 uses a particular extracted URL to establish a connection over a network 22 for accessing a server 24 which hosts a web site identified by that URL. In one possible implementation of the system 10, the URL may identify a web site which stores a number of alternative endings, portions of endings, portions of frames, or other alternative characteristics for a program corresponding to the television signal. As will be described in greater detail in conjunction with FIG. 2 below, a function implemented in the set-top box 14 utilizes viewer selection information stored in the memory 20 to modify the extracted or "base" URL, in order to identify a particular viewer-selected program characteristic available from the web site of the base URL. In this manner, the set-top box 14 requests the retrieval of video corresponding to a viewer-selected program characteristic from the server 24. The requested video is then downloaded from the server 24 to the memory 20 of set-top box 14 via the established connection over the network 22.

The television signal from broadcast transmitter 12 is displayed to the viewer on a display 26 of the television 16. Timing information embedded in the television signal indicates to the set-top box 14 when the retrieved video should be taken from memory 20 and displayed to the viewer on display 26 of television 16. The television signal may also include embedded size and location information which is employed directly, or as an input to a second function, to determine the respective size and location for display of the retrieved video on the display 26. For example, the retrieved video may be displayed within a window of the specified size at the specified location in the display 26. The size and location information may be scaled based on the actual size of the display 26. This enables seamless integration of the downloaded portion with the broadcast portion.

Figure 2:
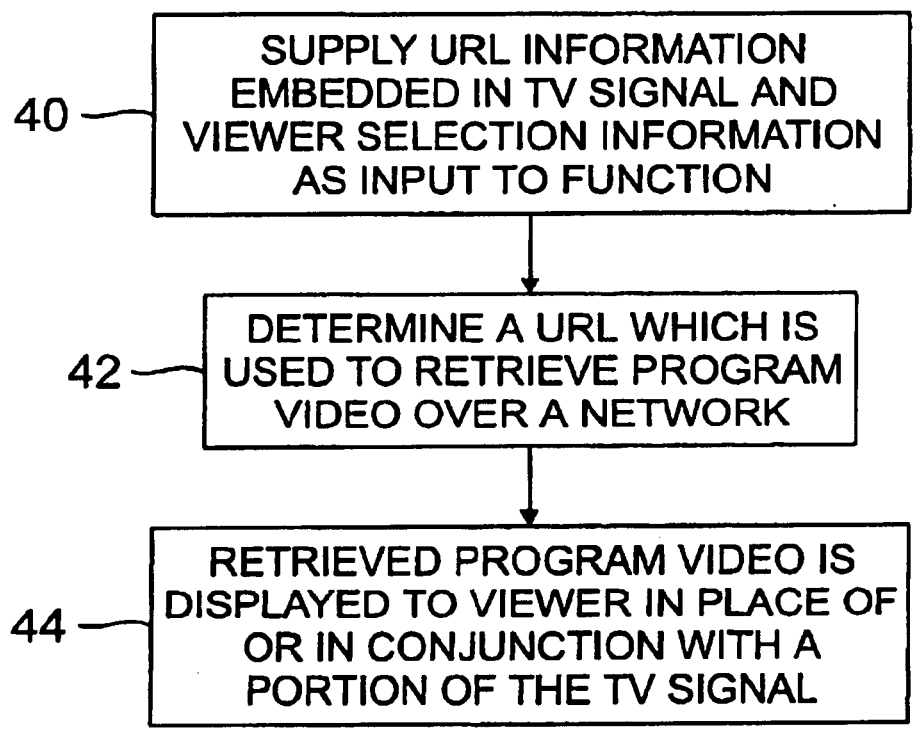
FIG. 2 is a flow diagram illustrating the general operation of the system of FIG. 1.

FIG. 2 is a flow diagram illustrating the general operation of the system 10 of FIG. 1 in more detail. Step 40 indicates that URL information embedded in a television signal is extracted and used as an input to a retrieval control function. The URL information may be the above-noted base URL identifying a web site storing a number of alternative program characteristics. The function may be a URL processing function implemented by the processor 18 of set-top box 14. Step 40 further indicates that another input to the function is viewer selection information which is stored in the memory 20 of the set-top box 14. This viewer selection information identifies one or more program characteristics previously selected by a viewer. In step 42, the function uses the extracted URL information and the viewer selection information to determine a URL which is used to retrieve program video from server 24 over the network 22. The retrieved program video provides the program characteristic selected by the viewer.

In step 44, the retrieved program video is displayed to the viewer in place of or in conjunction with the corresponding portion of the television signal. For example, if the retrieved program video is an alternate program ending, it may be "written over" an original default program ending transmitted as part of the television signal. As noted above, the retrieved video may alternatively be displayed in a window designated using size and location information embedded in the television signal.

Figure 3:
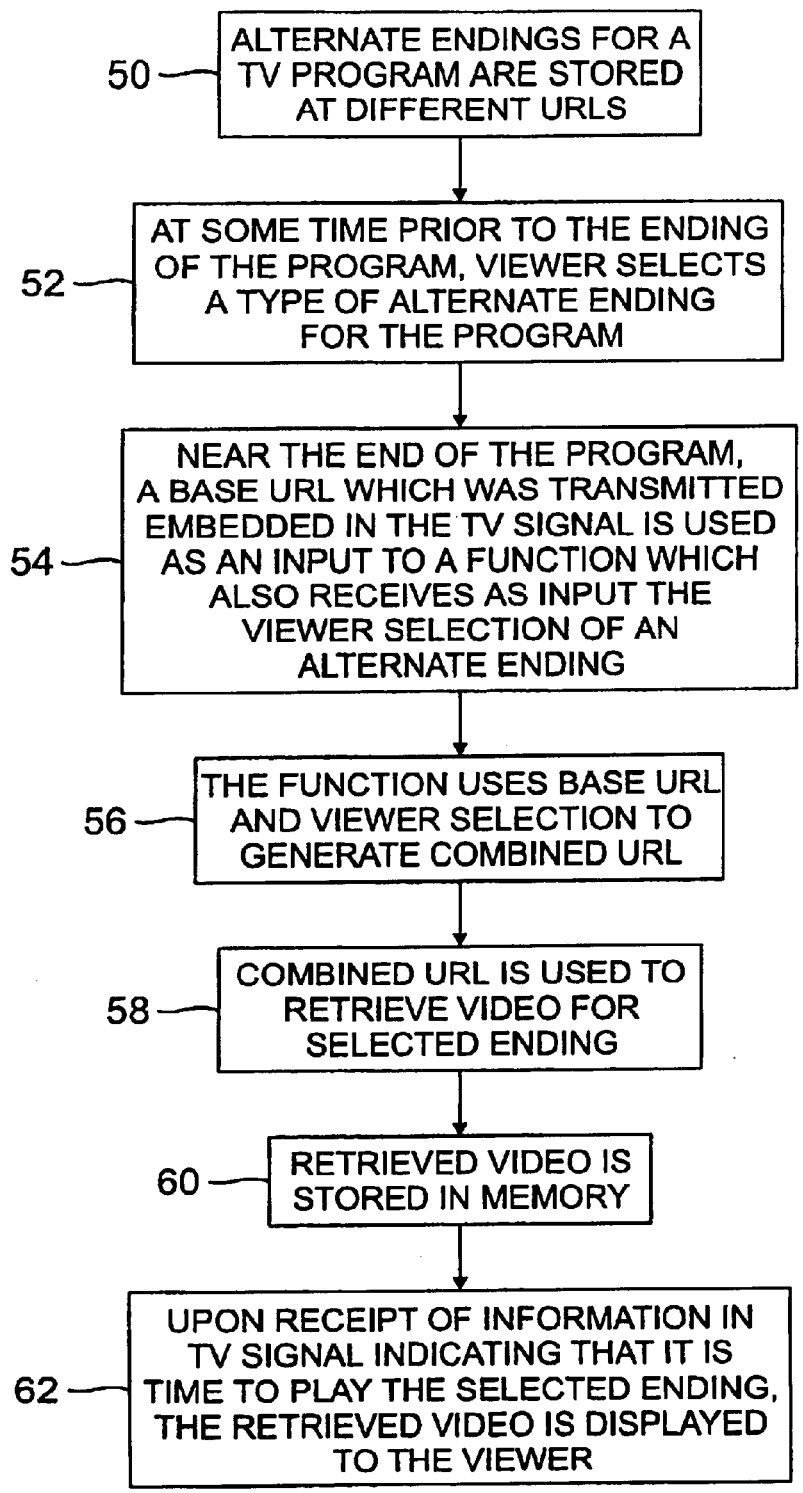
FIG. 3 is a flow diagram illustrating a more specific example of the operation of the system of FIG. 1 as applied to viewer-selectable program endings.

FIG. 3 is a flow diagram illustrating a more specific example of the operation of the system of FIG. 1. In this example, the program characteristic selected by a viewer is an ending for a program or a particular portion of a program, such as a happy ending or a sad ending. Step 50 indicates that a number of alternate endings for the program are stored at different UTRLs. At some time prior to the ending of the program, the viewer selects a type of available alternate ending for the program, as shown in step 52. This selection may be in response to available selection information displayed to the viewer at some time prior to the ending, or may be performed automatically based on a user profile. For example, a listing of available selections may be generated and displayed to the viewer by retrieving information identified by an additional URL which is transmitted embedded in the television signal. The viewer selection is stored in the memory 20 of the set-top box 14. In step 54, near the end of the program, a base URL, e.g., http://www.baseURL.com, which was transmitted embedded in the corresponding television signal, is extracted as previously described and applied as an input to a function implemented by processor 18 of set-top box 14. The function in step 54 also receives as an input the corresponding viewer selection of the type of available alternate ending he desires.

In step 56, the function processes the base URL and the viewer selection to generate a combined URL. For example, the combined URL may be http://www.baseURL.com/happy, which corresponds to a stored video which when integrated with the broadcast television signal results in a happy ending for the program, or http://www.baseURL.com/sad, which corresponds to a stored video which when integrated with the broadcast television signal results in a sad ending for the program. In step 58, the combined URL is used to retrieve the corresponding video via a connection established over the network 22. The retrieved video is then stored in a memory quickly accessible by the set-top box 14, e.g., memory 20, as shown in step 60. Upon receipt of information which also is transmitted embedded in the television signal and indicates the presentation time for the ending, the set-top box 14 retrieves the corresponding video from memory 20 and causes it to be displayed to the viewer, such that the viewer is provided with the desired ending. As previously noted, the television signal may include a default ending which is overwritten in whole or in part by the retrieved video. This default ending may be used in the event the viewer does not select an alternate ending, or if there is a problem in retrieving the video from the combined URL generated in step 56 of FIG. 3.

It should be noted that the invention is not limited to selection of endings of programs or portions of programs, but may be employed to change the overall content of a program, e.g., by changing what is shown to the viewer based on what is seen by a particular character, by changing elements of scenes, or even by supplying entire scenes. A given portion of the program corresponding to the broadcast television signal may thus be overwritten, in whole, in part, on a whole-television-screen basis or on a part-television-screen basis, by retrieved information. The invention may be similarly applied to the soundtrack or the musical score of a broadcast, e.g., very scary versus not so scary, upbeat versus blue, and so on. Also, alternative dialogue, or alternative language support, may be supplied via determined URLs. The invention allows viewer customization of these and numerous other program characteristics.

In other alternative embodiments of the invention, a program corresponding to the television signal may be made to appear within a window of a web page retrieved from a previously determined URL. Portions of the program may be made to appear within different windows of the retrieved page, as specified by information embedded within the television signal or by information retrieved as part of a page, or by a combination of both. Also, the windows may be borderless, so that the viewer cannot distinguish the retrieved portion of the display from the broadcast portion.

Figure 4:
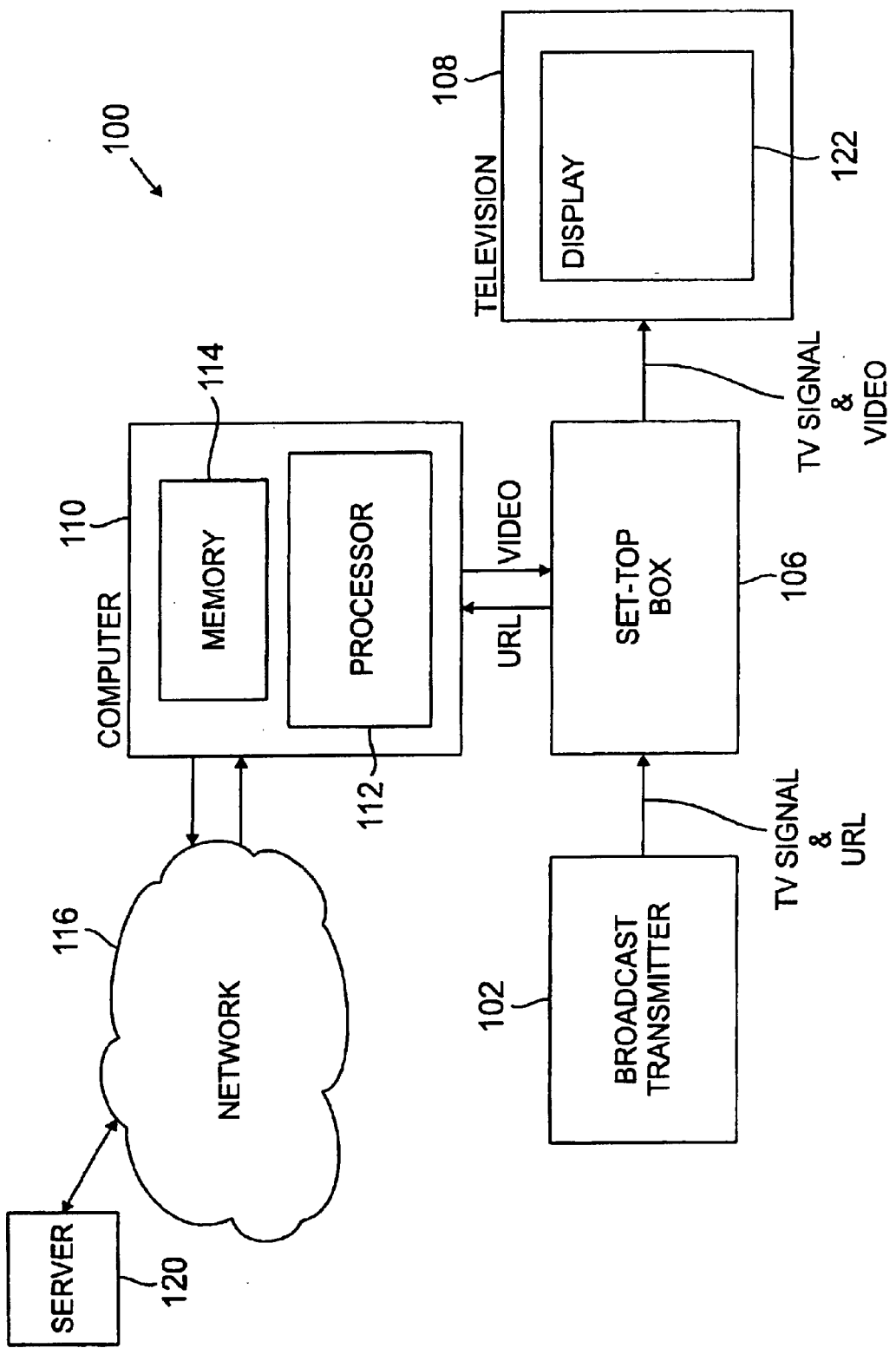
FIG. 4 illustrates an embodiment of the invention in which a set-top box operates in conjunction with a computer to process URLs embedded in a transmitted television signal.

FIG. 4 shows another embodiment of a system for implementing viewer-customized display of transmitted programming in accordance with the invention. The system 100 includes a broadcast transmitter 102, a set-top box 106, a television 108 and a computer 110. As in the system 10 of FIG. 1, a television signal transmitted from the broadcast transmitter 102 includes a program portion and one or more URLs, with the URLs transmitted so as to coincide with specified sections of the program portion. Also as noted previously, such a television signal may be received via an antenna, a cable network, a satellite receiver or other suitable receiving equipment. The set-top box 106 receives the television signal and the URLs embedded therein, and utilizes an internal decoder or other suitable mechanism to extract the embedded URLs. This internal decoder may, but need not, be a closed caption decoder. Any decoder suitable for detecting a transmitted URL or other transmitted network information identifier may be used. The set-top box 106 in this embodiment supplies extracted URLs to the computer 110.

The computer 110 includes a processor 112 and a memory 114, and is operative to establish a connection with a network 116 using the extracted URLs supplied from the set-top box 106. Like the network 22 of the FIG. 1 embodiment, the network 116 may be, for example, the Internet or any other computer, cable or satellite network as well as various portions or combinations thereof. The computer 110 may implement a web browser program or other suitable network access software.

The computer 110 uses the web browser program and an internal modem to establish a connection via network 116 to a server 120 corresponding to a given extracted URL. The server 120 delivers program video or other program information specified by the extracted URL to the computer 110 over the network 116, and the computer 110 stores the retrieved program information in the memory 114. At a time indicated by further information embedded in the television signal, e.g., subsequent to the embedded URL, the set-top box 106 directs the computer 110 to deliver the retrieved program information to the television 108 for presentation to a viewer on the display 122. The function for determining a combined URL from an embedded base URL may be implemented in this embodiment in either the computer 110 or the set-top box 106.

Figure 5:
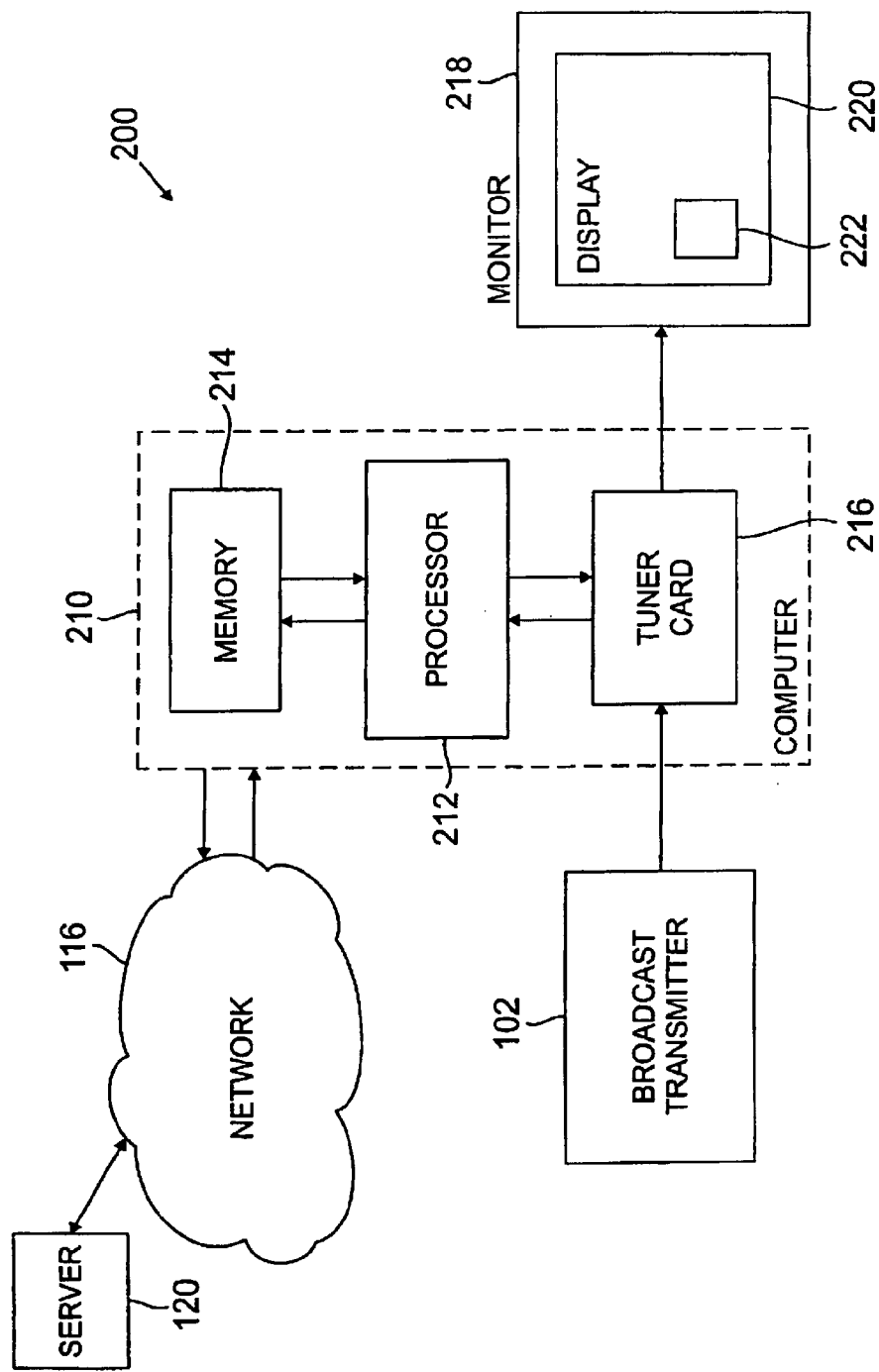
FIG. 5 illustrates an embodiment of the invention in which a computer with a tuner card is used to process URLs embedded in a transmitted television signal.

FIG. 5 shows another alternative embodiment of the invention. In a system 200 implementing viewer-customized display of transmitted programming, a television signal from broadcast transmitter 102 is supplied directly to a computer 210. The computer includes a processor 212, a memory 214 and a tuner card 216. As in the previous embodiments, the television signal transmitted from the broadcast transmitter 102 includes a program portion and one or more URLs, with the URLs transmitted so as to coincide with specified sections of the program portion. The television signal is applied to the tuner card 216. The tuner card 216 extracts URLs from the television signal and supplies the extracted URLs to the processor 212.

The computer 210 may implement a web browser program or other suitable network access software. The computer 210 uses the web browser program and an attached modem to establish a connection via network 116 to the server 120 corresponding to a given extracted URL. The server 120 delivers program video or other program information specified by the extracted URL to the computer 210 over the network 116, and the computer 210 stores the retrieved program information in the memory 214. At a time indicated by further information embedded in the television signal, e.g., subsequent to the embedded URL, the processor 212 directs delivery of the retrieved program information to a television 218 for presentation to a viewer on display 220. The function for determining a combined URL from an embedded base URL may be implemented in this embodiment in either the processor 212 or the tuner card 216 of the computer 210. As in the previous embodiments, the retrieved program information may displayed in a window 222 of the display 220, using size and location information embedded in the television signal, or overwritten on a portion of the original program portion of the television signal.

The embodiments of FIGS. 1, 4 and 5 may be used in applications such as video on demand (VOD). For example, a viewer could use a browser program associated with a set-top box or computer in order to contact a cable provider or other media content provider to order a movie or other type of program. As part of this ordering process, the content provider may present a number of different available story lines, movie ratings, endings or other program characteristics to the viewer. The presentation could be made within a window generated by the browser and displayed on a television or computer monitor. Moreover, the various alternate program characteristics may be presented in order of popularity as measured by the number of "hits" on the corresponding web sites. As the viewers make their selections, the web hit statistics are gathered and used to modify the presentation such that each viewer can get a general idea as to the popularity of various alternate program characteristics. The web hit statistics can also be fed back to the content providers for use in determining audience share and viewer preferences. The invention can thus be used to automate the VOD process while also providing viewers with the ability to customize various program characteristics. For example, once the viewer selections are made and the program is being delivered, URLs embedded in the corresponding television signal are extracted and processed in order to retrieve information regarding the program characteristics selected by the viewer. As noted previously, the term "television signal" is intended to include video signals generated in a VOD system.

Another feature which may be provided in the above-described VOD system as well as in other embodiments of the invention is the ability for a viewer to cycle through a number of different movie or other program endings for an additional fee. This feature may utilize an embedded URL which when extracted and processed results in the display of a web page to the viewer. The displayed web page indicates that the different endings are available, and the viewer then makes a selection which results in delivery of the corresponding video in a manner similar to that described previously. Again, the web page may display the available alternate endings so as to indicate their relative popularity based on web hit statistics. The selection may be made either during a program, such that the selected ending or endings are displayed in place of a default ending, or at the end of the program after the default ending has already been viewed. A similar arrangement may be used to provide an interactive survey at the end of a program. For example, a URL embedded in a television signal may be extracted and processed to retrieve a web page which asks questions regarding the program which has just ended. The viewer responses may be tabulated and displayed so as to provide immediate feedback to the viewers. These features are of course applicable to programs other than movies, television shows or VOD. For example, the techniques can be readily applied to popular music videos, or even to informational broadcasts.

Alternative embodiments of the invention may utilize different mechanisms for delivering URLs or other network information identifiers in conjunction with related television programming. For example, although it is noted above that transmitted URLs could be embedded in a closed caption text stream, other embodiments of the invention could incorporate the URLs into another portion of a transmitted television signal, such as onto a subcarrier or other signal associated with the television signal. It is also possible to transmit the URLs on another signal which is only roughly synchronized with the television signal. The URLs therefore need not be embedded in the transmitted television signal itself. Moreover, the URLs could be encoded or otherwise processed in any suitable manner prior to transmission rather than transmitted in a manner similar to that used to transmit closed-caption text. Furthermore, a variety of configurations other than those described in FIGS. 1, 4 and 5 may be used for extracting URLs and displaying corresponding web content in accordance with the invention. These and numerous other alternative embodiments within the scope of the following claims will be apparent to those skilled in the art.

What is claimed is:

1. A method of providing viewer-customized display of a program transmitted in the form of a television signal, comprising the steps of:

receiving at least one network information identifier transmitted with the television signal; and modifying a manner in which the program is displayed to a given viewer using information obtained by processing the network information identifier and a program characteristic selection made by the viewer;

wherein the information obtained by processing the network information identifier and the program characteristic selection made by the viewer comprises information retrieved utilizing another network information identifier different than the processed network information identifier.

2. The method of claim 1 wherein the network information identifier is a Uniform Resource Locator (URL) identifying a web site.

3. A method of providing viewer-customized display of a program transmitted in the form of a television signal, comprising the steps of:

receiving at least one network information identifier transmitted with the television signal; and modifying a manner in which the program is displayed to a given viewer using information obtained by processing the network information identifier and a program characteristic selection made by the viewer;

wherein the modifying step includes the steps of:

processing the network information identifier and the program characteristic selection to generate an additional network information identifier;

establishing a connection over a network with an information source identified by the additional network information identifier;

retrieving information from the information source; and utilizing the retrieved information to modify the manner in which the program is displayed to the viewer.

4. The method of claim 3 wherein the retrieved information includes video, and the utilizing step includes displaying the video to the viewer in place of at least a portion of the program.

5. The method of claim 4 wherein the portion of the program replaced by the retrieved video includes a portion of the program occupying a designated period of time.

6. The method of claim 4 wherein the portion of the program replaced by the retrieved video includes a portion of the program occupying a designated space on a display.

7. The method of claim 3 wherein the retrieved information includes audio, and the utilizing step includes playing the audio to the viewer in place of at least part of an audio portion of the program.

8. The method of claim 3 wherein the television signal includes timing information, and the utilizing step includes utilizing the timing information to determine when the retrieved information should be displayed to the viewer.

9. The method of claim 3 wherein the television signal includes at least one of size and location information, and the utilizing step includes utilizing the at least one of size and location information to determine at least one of a respective size and location of a window in which the retrieved information is to be displayed to the viewer.

10. The method of claim 1 wherein the program characteristic selection is made in response to a selection display generated at least in part using an additional network information identifier transmitted with the television signal.

11. The method of claim 10 wherein the selection display is in the form of a web page retrieved using the additional network information identifier.

12. A method of providing viewer-customized display of a program transmitted in the form of a television signal, comprising the steps of:

receiving at least one network information identifier transmitted with the television signal; and modifying a manner in which the program is displayed to a given viewer using information obtained by processing the network information identifier and a program characteristic selection made by the viewer;

wherein the program characteristic selection is made in response to a selection display generated at least in part using an additional network information identifier transmitted with the television signal; and wherein the selection display provided to the given viewer includes a listing of available selections presented along with statistical information regarding previous selections made by other viewers.

13. An apparatus for providing a viewer-customized display of a program transmitted in the form of a television signal, comprising:

a memory for storing a program characteristic selection made by a given viewer; and a processor coupled to the memory, wherein the processor is operative to receive at least one network information identifier transmitted with the television signal, and to modify a manner in which the program is displayed to the viewer using information obtained by processing the network information identifier and the program characteristic selection made by the viewer;

wherein the information obtained by processing the network information identifier and the program characteristic selection made by the viewer comprises information retrieved utilizing another network information identifier different than the processed network information identifier.

14. The apparatus of claim 13 wherein the network information identifier is transmitted as part of the television signal.

15. The apparatus of claim 13 wherein the network information identifier is transmitted on a signal associated with the television signal.

16. The apparatus of claim 13 wherein the network information identifier is transmitted on a subcarrier of the television signal.

17. The apparatus of claim 13 wherein the network information identifier is a Uniform Resource Locator (URL) identifying a web site.

18. An apparatus for providing a viewer-customized display of a program transmitted in the form of a television signal, comprising:

a memory for storing a program characteristic selection made by a given viewer; and a processor coupled to the memory, wherein the processor is operative to receive at least one network information identifier transmitted with the television signal, and to modify a manner in which the program is displayed to the viewer using information obtained by processing the network information identifier and the program characteristic selection made by the viewer;

wherein the processor is further operative: (i) to process the network information identifier and the program characteristic selection to generate an additional network information identifier; (ii) to establish a connection over a network with an information source identified by the additional network information identifier; (iii) to retrieve information from the information source; and (iv) to utilize the retrieved information to modify the manner in which the program is displayed to the viewer.

19. The apparatus of claim 18 wherein the retrieved information includes video which is displayed to the viewer in place of at least a portion of the program.

20. The apparatus of claim 19 wherein the portion of the program replaced by the retrieved video includes a portion of the program occupying a designated period of time.

21. The apparatus of claim 19 wherein the portion of the program replaced by the retrieved video includes a portion of the program occupying a designated space on a display.

22. The apparatus of claim 18 wherein the retrieved information includes audio which is played to the viewer in place of at least part of an audio portion of the program.

23. The apparatus of claim 18 wherein the television signal includes timing information which is used to determine when the retrieved information should be displayed to the viewer.

24. The apparatus of claim 18 wherein the television signal includes at least one of size and location information which are used to determine at least one of a respective size and location of a window in which the retrieved information is to be displayed to the viewer.

25. The apparatus of claim 13 wherein the viewer selection is made in response to a selection display generated at least in part by the processor using an additional network information identifier transmitted with the television signal.

26. The apparatus of claim 25 wherein the selection display is in the form of a web page retrieved by the processor using the additional network information identifier.

27. An apparatus for providing a viewer-customized display of a program transmitted in the form of a television signal, comprising:

a memory for storing a program characteristic selection made by a given viewer; and a processor coupled to the memory, wherein the processor is operative to receive at least one network information identifier transmitted with the television signal, and to modify a manner in which the program is displayed to the viewer using information obtained by processing the network information identifier and the program characteristic selection made by the viewer;

wherein the viewer selection is made in response to a selection display generated at least in part by the processor using an additional network information identifier transmitted with the television signal;

wherein the selection display provided to the given viewer includes a listing of available selections presented along with statistical information regarding previous selections made by other viewers.

28. An apparatus for providing a viewer-customized display of a program transmitted in the form of a television signal, comprising:

means for receiving at least one network information identifier transmitted with the television signal; and means for modifying a manner in which the program is displayed to a given viewer using information obtained by processing the network information identifier and a program characteristic selection made by the viewer;

wherein the information obtained by processing the network information identifier and the program characteristic selection made by the viewer comprises information retrieved utilizing another network information identifier different than the processed network information identifier.

29. An apparatus for providing a viewer-customized display of a program transmitted in the form of a television signal, comprising:

means for storing a program characteristic selection made by a viewer; and means for processing the program characteristic selection and a network information identifier transmitted with the television signal, to obtain additional information which is used to modify a manner in which the program is displayed to the viewer;

wherein the information obtained by processing the network information identifier and the program characteristic selection made by the viewer comprises information retrieved utilizing another network information identifier different than the processed network information identifier.

30. A method for providing a viewer-customized display of a program transmitted in the form of a television signal, comprising the steps of:

storing a program characteristic selection made by a viewer; and processing the program characteristic selection and a network information identifier transmitted with the television signal, to obtain additional information which is used to modify a manner in which the program is displayed to the viewer;

wherein the information obtained by processing the network information identifier and the program characteristic selection made by the viewer comprises information retrieved utilizing another network information identifier different than the processed network information identifier.

31. A method of providing viewer-customized display of a program transmitted in the form of a television signal, comprising the steps of:

receiving at least one network information identifier transmitted with the television signal; and changing the content of the program, as perceived by a viewer, from that which is broadcast, using information obtained by processing the network information identifier and a program characteristic selection made by the viewer;

wherein the information obtained by processing the network information identifier and the program characteristic selection made by the viewer comprises information retrieved utilizing another network information identifier different than the processed network information identifier.

32. An apparatus for providing a viewer-customized display of a program transmitted in the form of a television signal, comprising:

a memory for storing a program characteristic selection made by a given viewer; and a processor coupled to the memory, wherein the processor is operative to receive at least one network information identifier transmitted with the television signal, and to change the content of the program, as perceived by a viewer, from that which is broadcast, using information obtained by processing the network information identifier and the program characteristic selection made by the viewer;

wherein the information obtained by processing the network information identifier and the program characteristic selection made by the viewer comprises information retrieved utilizing another network information identifier different than the processed network information identifier.

33. An apparatus for providing viewer-customized display of a program transmitted in the form of a television signal, comprising:

a tuner for receiving the television signal and extracting at least one network information identifier transmitted with the television signal; and a network interface for retrieving information designated by the extracted network information identifier and a program characteristic selection made by the viewer, wherein the retrieved information is used to change the content of the program, as perceived by a viewer, from that which is broadcast;

wherein the retrieved information designated by the extracted network information identifier and the program characteristic selection made by the viewer is retrieved at least in part based on another network information identifier different than the extracted network information identifier.

34. The apparatus of claim 33 further including a display for displaying the retrieved information to the viewer in place of at least a portion of the program.

35. The apparatus of claim 33 wherein the retrieved information used to change the content of the program includes video information.

36. The apparatus of claim 33 wherein the retrieved information used to change the content of the program includes audio information.

* * * * *